Nov. 13, 1945.  L. C. POTTER  2,388,704

FLUID BRAKE

Filed Jan. 2, 1943  2 Sheets-Sheet 2

Inventor
Leman Curtis Potter
By Alexander Dowell
Attorneys

Patented Nov. 13, 1945

2,388,704

UNITED STATES PATENT OFFICE 2,388,704

FLUID BRAKE

Leman Curtis Potter, Royal Oak, Mich.

Application January 2, 1943, Serial No. 471,167

20 Claims. (Cl. 188—90)

This invention is a novel improvement in fluid brakes for automobiles and other vehicles or the like, and the principal object thereof is to provide a brake adapted to be connected to the drive shaft of an automobile or the like, or to be connected with the crown gear of the differential of the automobile or other vehicle, said brake including a cylinder having a head herein provided with fins and rotated rapidly by the drive shaft or crown gear in a direction corresponding with the direction of rotation of the drive shaft or crown gear, said brake also having a piston in the cylinder provided with fins and rotated slowly by the drive shaft or crown gear but in a direction opposite from that of the head, the space between the piston and head containing a liquid and air, and the level of the liquid between the head and piston being low when the head and piston are separated; and means being provided on the brake for moving the piston in the cylinder towards the head to compress the liquid and air confined therebetween, the braking effect increasing as the piston is moved towards the head due to the rise in the level of the liquid as the air and liquid are compressed into a smaller space, whereby when the piston is so moved the drag will set up a variable counter torque transmitted by the rotated piston to the drive shaft or crown gear in a direction opposite to their directions of rotation and serving as an effective braking means.

I will explain the invention with reference to the accompanying drawings, which illustrate several practical embodiments thereof, to enable others familiar with the art to adopt and use the same; and will summarize in the claims the novel features of construction, and novel combination of parts, for which protection is desired.

In said drawings:

Fig. 5 is a vertical section through the differential housing showing a modified form of fluid brake applied to the crown gear of the differential of the automobile or the like.

Figure 1:
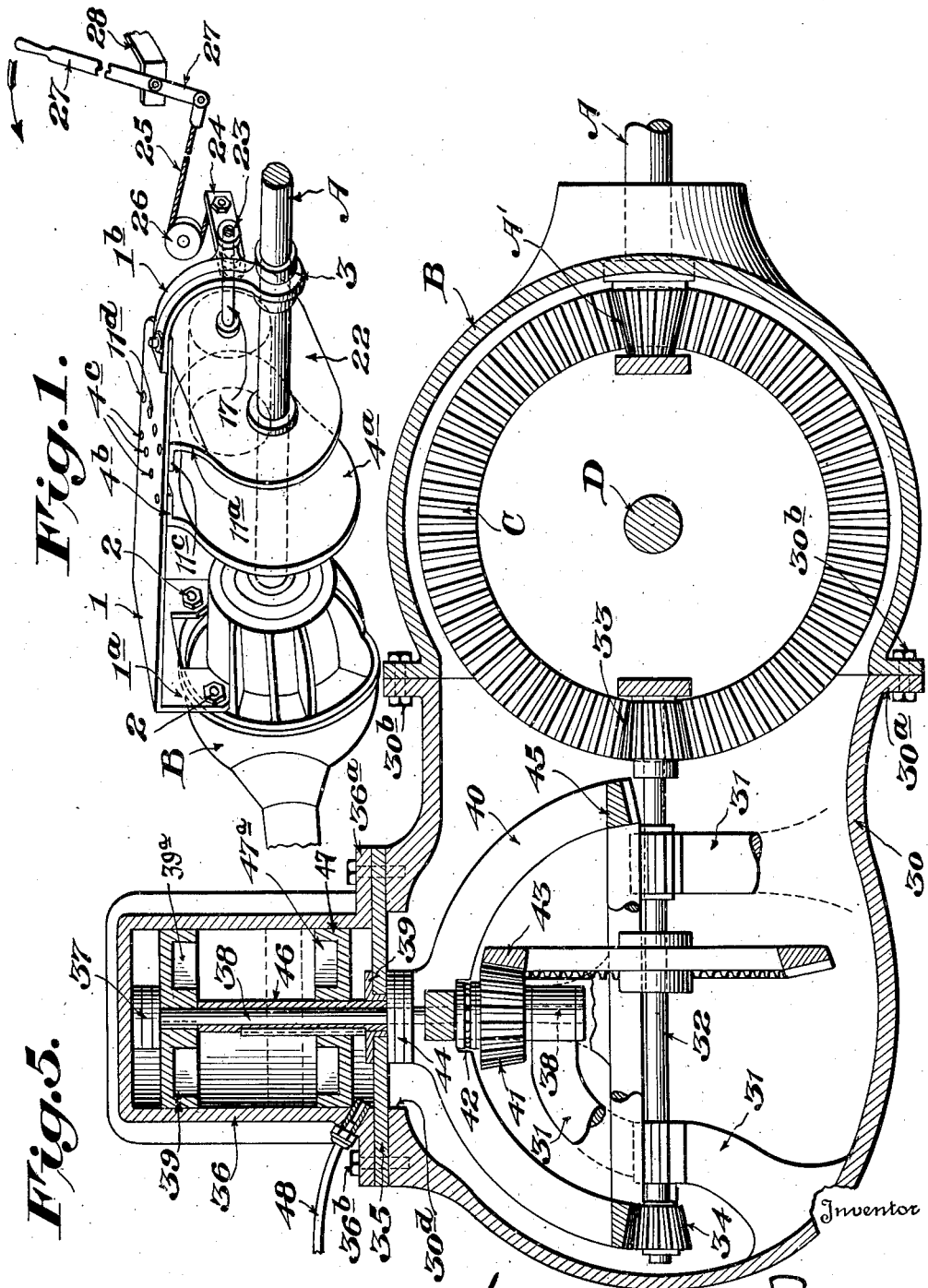
Fig. 1 is a perspective view of the rear portion of a conventional drive shaft and differential housing of an automobile or the like, showing one form of novel fluid brake applied thereto.

The invention is illustrated in connection with an automobile having a conventional drive shaft A entering a differential housing B, the drive shaft being provided with a beveled pinion A' (Fig. 5) meshing with a crown gear C which drives in a conventional manner the drive axle D of the vehicle.

In the form shown in Figs. 1 to 4, the fluid brake is applied to the drive shaft A. A bracket plate 1 overlies the drive shaft and has a flange 1a at its rear end secured by bolts 2 or the like to the front end of differential housing B, said plate being substantially horizontally disposed. An arcuate arm 1b is secured to the front end of plate 1a, said arm curving downwardly and carrying a roller or other bearing 3 for drive shaft A, said arm 1b rigidly supporting the forward end of plate 1 with respect to shaft A.

Figure 2:
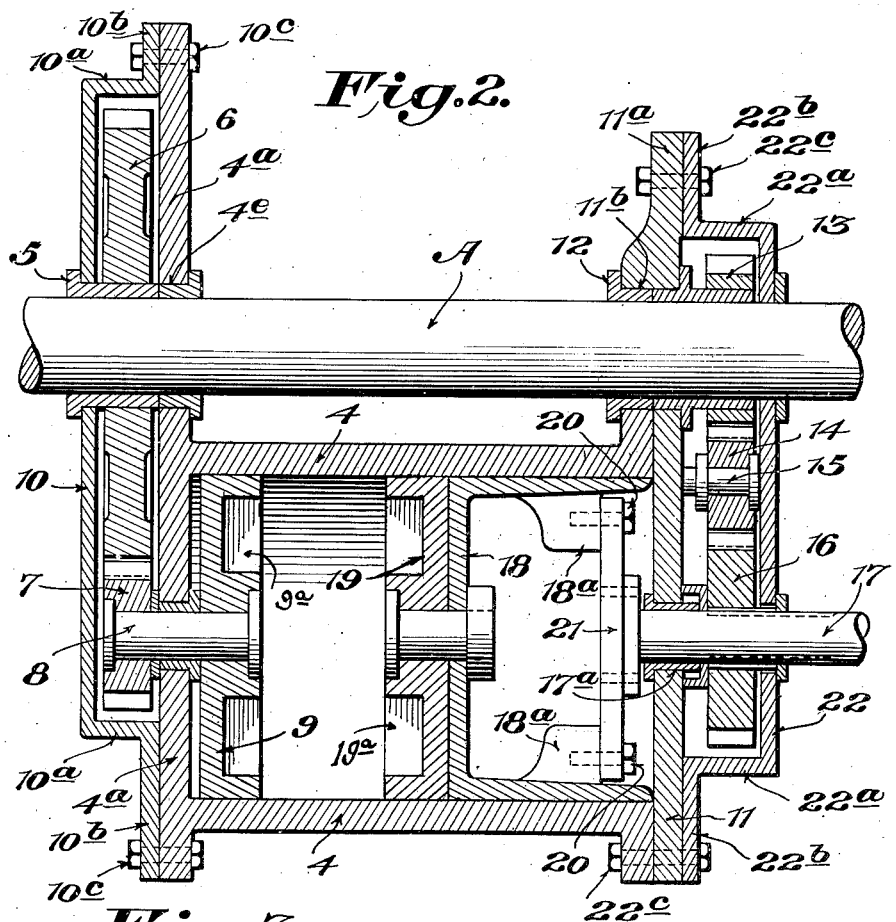
Fig. 2 is a horizontal section taken in the plane of the drive shaft and brake cylinder.
Figure 3:
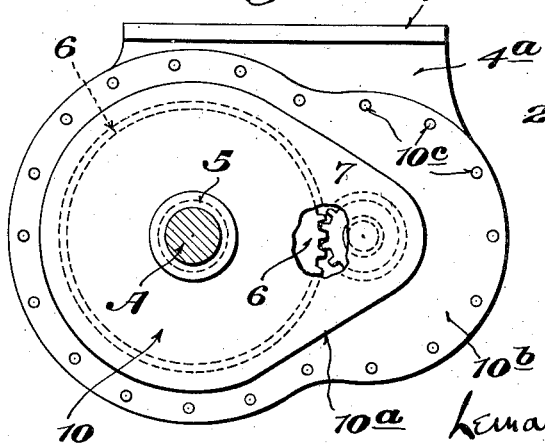
Fig. 3 is an end view, partly broken away, showing the means for rotating the cylinder head from the drive shaft of Fig. 2.
Figure 4:
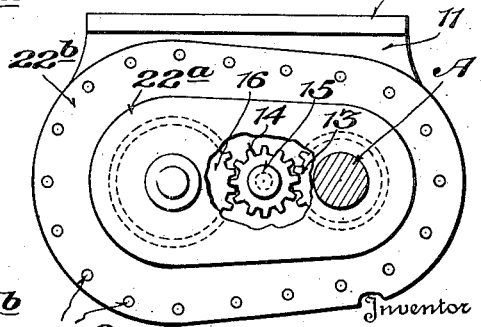
Fig. 4 is an end view, partly broken away, showing the means for rotating the piston in a direction opposite to the rotation of the cylinder head.

Suspended from bracket plate 1 is a cylinder 4 (Fig. 2) having an end wall 4a closing one end of the cylinder and extending laterally of the cylinder 4 as shown in Fig. 2, and extending above the cylinder and being flanged as at 4b (Figs. 1 and 3), said flange 4b being secured to the underside of bracket plate 1 by means of bolts or rivets 4c or the like, as shown in Fig. 1. The laterally extending portion of end wall 4a has an opening 4e (Fig. 2) therein adapted to receive a collar 5 fixedly mounted on drive shaft A, which shaft is disposed laterally of and substantially in the horizontal plane of the axis of cylinder 4. The collar 5, being fixedly mounted upon shaft A, rotates therewith and carries a relatively large gear 6 fixedly mounted thereon, said gear 6 being disposed beside end wall 4a, and said gear 6 meshing with a smaller gear 7 mounted upon a stub shaft 8 journaled in end wall 4a axially of cylinder 4. Shaft 8 carries within cylinder 4 a rotatable head 9 which is provided with suitable fins 9a cooperating with the liquid in said cylinder. The head 9 is thus rotated directly by the drive shaft A and at relatively high speed since gear 6 is of substantially larger diameter than gear 7.

A housing 10 is provided over the gears 6 and 7, having walls 10a enclosing said gears and having a bolting flange 10b at its periphery secured by screws 10c or the like to the end wall 4a, said housing protecting the gears 6 and 7 from dirt and forming a lubricant reservoir for said gears.

The opposite end of the cylinder 4 is open, but is normally closed by a plate 11 having a lateral extension 11a (Fig. 2) provided with an opening 11b receiving a collar 12 fixedly mounted on drive shaft A as indicated in Fig. 2, said collar 12 carrying a small gear 13 fixedly mounted thereon beside plate 11 meshing with an idler gear 14 mounted on a stub shaft 15 journaled on the plate 11, the idler gear 14 meshing with a gear 16 which is larger than the gear 13, said gear 16 being splined on a rotatable piston rod 17 passing through the plate 11 and into the cylinder 4 on the axis thereof, a suitable bearing 17a being provided in plate 11 for the piston rod 17. The upper edge of the plate 11 is flanged as at 11c and secured to the underside of bracket plate 1 by bolts or rivets 11d or the like, as shown in Fig. 1. Owing to the provision of idler gear 14, the piston rod 17 will be rotated at slower speed than drive shaft A and in the opposite direction from the head 9.

Within the cylinder 4 is a piston 18 carrying a head 19 adapted to rotate with the piston, said piston having lugs 18a for the reception of screws 20 which secure a plate 21 fixedly mounted on the inner end of the piston rod 17 to the piston 18 to cause the piston 18 to rotate with the piston rod 17. Head 19 is also provided with fins 19a which cooperate with the liquid and air confined in cylinder 4 between the heads 9 and 19.

On the plate 11 is a housing 22 having walls 22a enclosing the gears 13, 14 and 16 and having a bolting flange 22b at its periphery secured to the plate 11 by screws or bolts 22c or the like, said housing 22 protecting the gears 13, 14 and 16 from dirt, and forming a lubricant reservoir for said gears. Suitable packing rings may be provided to prevent the escape of lubricant from the housing 22 along the drive shaft A and along the piston rod 17.

The inner end of piston rod 17 is journaled in the bearing 17a as hereinbefore mentioned, while the outer end thereof is rotatably mounted in a bearing bracket 23 (Fig. 1) extending from the arm of plate 1 to maintain the piston rod 17 in alignment with the axis of cylinder 4.

Piston rod 17 is moved axially of the cylinder 4 to vary the distance between the heads 9 and 19 by means of an actuator 24 engaging spaced collars on the rotatable piston rod 17 so as to permit the piston rod to rotate freely in its bearings 17a and 23. The actuator 24 is secured to one end of a cable 25 which runs around a pulley 26 mounted on the vehicle frame, the other end of said cable 25 being secured to the lower end of a brake lever 27 pivoted on the foot board of the vehicle in a position convenient to the operator of the vehicle. When the brake lever 27 is pulled in the direction of the arrow (Fig. 1) the actuator 24 will be shifted rearwardly thereby moving the rotating piston rod 17 rearwardly of the vehicle, causing the rotating piston 18 to approach the head 9. The liquid level in chamber 4 is low when members 9, 19 are separated and the braking increases as these members are brought closer together, due to the rise in the level of the liquid as the air and liquid are compressed into a smaller space between the oppositely rotating heads 9 and 19, thereby setting up a drag on the head 19 varying with the pressure applied on the brake lever 27, which drag sets up a countertorque on the drive shaft A through the gears 16, 14 and 13, in a direction opposite from the direction of rotation of said drive shaft, said countertorque functioning as an effective braking means.

In the modification shown in Fig. 5, the fluid brake is applied to the crown gear of the differential. The usual rear inspection plate of the differential housing B is removed, and in place thereof a casing 30 having bolting flanges 30a is secured to the corresponding flanges of the housing B by bolts 30b or the like, said housing 30 having bearing arms 31 in which is journaled a horizontally disposed shaft 32 carrying at one end a beveled gear 33 meshing directly with crown gear C of the differential, whereby the shaft 32 will be rotated by and with the crown gear C. On the opposite end of shaft 32 within the housing 30 is a second beveled gear 34.

Casing 30 is provided with an opening 30d in its upper end normally closed by a plate 35 upon which is placed a cylinder 36 closed at its upper end and having a bolting flange 36a at its lower end, screws 36b passing through the flange 36a and through plate 35 and into the casing 30, as shown in Fig. 5. At the upper end of the cylinder 36 is a thrust bearing 37 for a vertical shaft 38 carrying a rotatable head 39 which is provided with fins 39a cooperating with the liquid in the cylinder 36. The shaft 38 passes downwardly through a packing 39 in plate 35 and through an axial bore in the hub of a rotatable spider 40 and carries below the hub of the spider a beveled gear 41, the lower end of shaft 38 being mounted in a bearing extension of one of the bearing arms 31, as indicated in Fig. 5. Between the hub of spider 40 and the gear 41 is a thrust bearing 42. Bevel gear 41 meshes with a ring gear 43 fixedly mounted upon horizontal shaft 32, whereby rotation of the shaft 32 will rotate the shaft 38 and the head 39 at relatively high speed since the ring gear 43 is of larger size than the bevel gear 41, and the direction of rotation of head 39 will correspond with the direction of rotation of the crown gear C and drive shaft A.

The hub of spider 40 is disposed between thrust bearing 42 and a second thrust bearing 44 engaging the underside of plate 35. Spider 40 carries a ring gear 45 which is horizontally disposed and which meshes with the bevel gear 34 carried by shaft 32, whereby the ring gear 45 will be rotated at relatively slow speed by and with rotation of the shaft 32. The hub of spider 40 carries a tubular shaft 46 within cylinder 36 surrounding the shaft 38 and passing through the packing 39 in the plate 35. A rotatable head 47 having fins 47a is splined upon the shaft 46 so as to be movably axially of the cylinder 36, as indicated in dotted lines in Fig. 5, and the head 47 will be rotated by said shaft at a slower speed than the head 39 and in the opposite direction due to the above arrangement of gearing and shafting, so that resistance to rotation of head 47 will set up a countertorque on the crown gear C of the differential.

The cylinder 36 contains liquid and air between the heads 47 and 39, which liquid normally is of less volume than required to fill the space between the heads when the head 47 is in lowermost position shown in full lines in Fig. 5.

In order to raise the head 47 within the cylinder, a pressure duct 48 is provided entering the lower end of cylinder 36 between head 47 and the plate 35, whereby fluid may be supplied under pressure into the space between the head 47 and plate 35 to cause the head 47 to shift axially upwardly towards the head 39. The liquid level in chamber 36 is low when members 47 and 39 are separated, and the braking effect increases as these members are brought closer together due to compression of the air and liquid into the smaller space between the members 47 and 39, thereby effecting braking action on the crown gear C by reason of the drag on the rotating head 47 which drag sets up counter torque on crown gear C varying with the pressure within duct 48. The fluid supplied through duct 48 is preferably controlled by a foot pedal in a conventional manner.

By the above construction, head 39 will normally be rotated by the crown gear C through the shaft 32, ring gear 43, pinion 41 and shaft 38 at relatively high speeds and in a direction corresponding with the direction of rotation of the drive shaft A of the vehicle. Simultaneously, shaft 32 will rotate the spider 40 through the ring gear 45 and will thereby rotate the tubular shaft 46 in a direction opposite from that of shaft 38 and at a much slower speed. When fluid under pressure is admitted through the duct 48, the head 47 will rise as shown in dotted lines in Fig. 5 and the liquid and air in the cylinder between the heads 39 and 47 will be compressed into a smaller space and the drag on head 47 will set up a counter torque which is imparted through the spider 40 and ring gear 45 to the shaft 32, thus providing a braking action on the crown gear C and consequently on the drive shaft A.

I do not limit my invention to the exact forms shown in the drawings, for obviously changes may be made therein within the scope of the claims.

I claim:

1. A fluid brake for automobiles or the like having a drive shaft, comprising a fixed cylinder; a head in said cylinder rotated by the drive shaft; a piston in said cylinder rotated by the drive shaft; liquid and air confined in said cylinder between said head and piston; and means for moving said piston towards and away from the head.

2. In a brake as set forth in claim 1, means for mounting the cylinder beside the drive shaft; and gear trains connecting the head and drive shaft, and the piston and drive shaft, respectively.

3. In a brake as set forth in claim 1, said drive shaft including a differential having a crown gear, means for mounting said cylinder on said differential; a common shaft rotated by the crown gear; a pair of concentric shafts entering the cylinder and carrying the head and piston respectively; and gear trains between the common shaft and the concentric shafts, respectively.

4. A fluid brake for automobiles or the like having a drive shaft, comprising a cylinder; a head in said cylinder rotated by the drive shaft; a piston in said cylinder rotated by the drive shaft in the opposite direction from the head; liquid and air confined in said cylinder between said head and piston; and means for moving said piston towards and away from the head.

5. In a brake as set forth in claim 4, means for mounting the cylinder beside the drive shaft; and gear trains connecting the head and drive shaft, and the piston and drive shaft, respectively; one train including an idling reversing gear.

6. In a brake as set forth in claim 4, said drive shaft including a differential having a crown gear; means for mounting said cylinder on said differential; a common shaft rotated by the crown gear; a pair of concentric shafts entering the cylinder and carrying the head and piston respectively; and gear trains between the common shaft and the concentric shafts, respectively, for rotating the concentric shafts in opposite directions.

7. A fluid brake for automobiles or the like having a drive shaft comprising a cylinder; a head in said cylinder rotated at relatively high speed by the drive shaft and in a direction corresponding with the direction of rotation of the drive shaft; a piston in said cylinder rotated at relatively slow speed by the drive shaft in the opposite direction of rotation from said head; liquid and air confined in said cylinder between said head and piston; and means for moving said piston towards and away from the head.

8. In a brake as set forth in claim 7, means for mounting the cylinder beside the drive shaft; and gear trains connecting the head and drive shaft, and the piston and drive shaft, respectively; one train including an idling reversing gear.

9. In a brake as set forth in claim 7, said drive shaft including a differential having a crown gear; means for mounting said cylinder on said differential; a common shaft rotated by the crown gear; a pair of concentric shafts entering the cylinder and carrying the head and piston respectively; and gear trains between the common shaft and the concentric shafts respectively for rotating the concentric shafts in opposite directions.

10. A fluid brake for automobiles or the like having a drive shaft, comprising a cylinder mounted beside the drive shaft; a rotatable head in said cylinder; a shaft carrying the head; a gear train between the drive shaft and second shaft for rotating the head in a direction corresponding with the rotation of the drive shaft; an axially movable piston shaft entering the cylinder; a rotatable piston in said cylinder on said piston shaft; liquid and air in the cylinder confined between the head and piston; means for moving said piston shaft; a gear splined on said piston shaft; and a second gear train between said splined gear and drive shaft for rotating said piston shaft in a direction opposite to the rotation of the head, whereby when the rotating piston is moved towards the head the drag on the piston due to the liquid and air will set up a proportional counter torque on said drive shaft.

11. In a brake as set forth in claim 10, said first mentioned gear train rotating the head at relatively high speed; and said second gear train rotating the piston at relatively slow speed.

12. In a brake as set forth in claim 10, said drive shaft entering a differential housing; a horizontally disposed bracket plate above the drive shaft having its rear end secured to the differential housing; a downwardly curved arm at the front end of said plate carrying a bearing journaled on the drive shaft; and said cylinder being secured to the underside of said plate.

13. In a brake as set forth in claim 10, said cylinder having one end closed by an end plate provided with a lateral extension; a collar journalled in said extension adapted to be fixedly mounted on the drive shaft, said collar carrying one gear of the first gear train; a removable end plate closing the open end of the cylinder, and having a bearing for the piston shaft, and having a lateral extension; and a second collar journaled in the extension of said removable end plate adapted to be fixedly mounted on the drive shaft; said second collar carrying one gear of the second train.

14. In a brake as set forth in claim 10, said cylinder having one end closed by an end plate provided with a lateral extension; a collar journaled in said extension adapted to be fixedly mounted on the drive shaft, said collar carrying one gear of the first gear train; a housing mounted on said end plate enclosing the first gear train; a removable end plate closing the open end of the cylinder and having a bearing for the piston shaft and having a lateral extension; a second collar journaled in the extension of said removable end plate adapted to be fixedly mounted on the drive shaft, said second collar carrying one gear of the second gear train; and a second housing mounted on said removable end plate enclosing the second gear train.

15. A fluid brake for automobiles or the like having a differential including a crown gear, comprising a cylinder casing mounted on the differential; a shaft journaled in the casing having a pinion meshing with the crown gear; a pair of concentric shafts journaled in the casing and extending axially into the cylinder; a second pinion on said inner concentric shaft; a gear mounted on said first shaft and meshing with said second pinion for rotating the inner concentric shaft in a direction corresponding with the rotation of the crown gear; a rotatable head in the cylinder mounted on the inner shaft; a spider mounted on the outer concentric shaft and carrying a ring gear; a third pinion on the first shaft meshing with the ring gear for rotating the outer concentric shaft in a direction opposite from the rotation of the inner concentric shaft; a piston within the cylinder splined on the outer concentric shaft; liquid and air confined in the cylinder between the head and piston; and means for moving the piston towards and away from the head whereby the drag on the piston due to the liquid and air will set up a proportional counter torque on said first shaft.

16. In a brake as set forth in claim 15, said piston moving means comprising a plate in the cylinder behind the piston forming with the piston an expansible chamber, and a pressure fluid duct entering said chamber for supplying liquid thereto from a source of supply.

17. A fluid brake for automobiles or the like having a differential including a crown gear, comprising a cylinder casing mounted on the differential; a shaft journaled in the casing having a pinion meshing with the crown gear; a pair of concentric shafts journaled in the casing and extending axially into the cylinder; a second pinion on said inner concentric shaft; a relatively large gear mounted on said first shaft and meshing with said second pinion for rapidly rotating the inner concentric shaft in a direction corresponding with the rotation of the crown gear; a rotatable head in the cylinder mounted on the inner shaft; a spider mounted on the outer concentric shaft and carrying a ring gear; a third pinion on the first shaft meshing with the ring gear for slowly rotating the outer concentric shaft in a direction opposite from the rotation of the inner concentric shaft; a piston within the cylinder splined on the outer concentric shaft; liquid and air confined in the cylinder between the head and piston; and means for moving the piston towards and away from the head whereby the drag on the piston due to the liquid and air will set up a proportional counter torque on said first shaft.

18. In a brake as set forth in claim 17, said piston moving means comprising a plate in the cylinder behind the piston forming with the piston an expansible chamber, and a pressure fluid duct entering said chamber for supplying liquid thereto from a source of supply.

19. A fluid brake cylinder having one end closed by an end plate having a lateral extension; a collar journaled in said extension adapted to be fixedly mounted on a drive shaft; a rotatable head in said cylinder; a shaft carrying said head; intermeshing gears on the collar and second shaft for rotating the head in one direction; a removable end plate closing the other end of said cylinder and having a lateral extension; a second collar journaled in said extension of the removable plate and adapted to be fixedly mounted on the drive shaft; a rotatable piston shaft journaled in said removable plate and axially movably mounted with respect to the cylinder; a piston in said cylinder mounted on said piston shaft; and a gear train between said piston shaft and second collar for rotating the piston in a direction opposite to the rotation of said head.

20. A fluid brake cylinder including a casing adapted to be mounted on a differential; a shaft journaled in said casing; a pinion gear on said shaft adapted to mesh with the differential crown gear; a pair of concentric shafts journaled in the casing and extending axially into the cylinder; a second pinion on the inner concentric shaft; a relatively large gear mounted on said first shaft and meshing with said second pinion for rotating the inner concentric shaft in one direction; a head in the cylinder mounted on the inner concentric shaft; a spider mounted on the outer concentric shaft and carrying a ring gear; a third pinion on the first shaft meshing with the ring gear for rotating the outer concentric shaft in a direction opposite from that of the inner shaft; a piston within the cylinder splined on the outer concentric shaft; and means for moving the piston.

LEMAN CURTIS POTTER.